United States Patent [19]

Gergely et al.

[11] Patent Number: 5,013,120

[45] Date of Patent: May 7, 1991

[54] MONOCHROMATOR TO FIBER-CABLE COUPLING SYSTEM

[75] Inventors: John S. Gergely; F. Monte Evens, both of Ponca City, Okla.

[73] Assignee: Conoco Inc., Ponca City, Okla.

[21] Appl. No.: 531,964

[22] Filed: May 31, 1990

[51] Int. Cl.⁵ .................. G02B 6/32; G02B 3/04; G01J 3/30

[52] U.S. Cl. .............................. 350/96.18; 350/96.15; 350/320; 350/433; 356/318; 356/326

[58] Field of Search ............... 350/96.10, 96.15, 96.18, 350/96.20, 320, 433; 356/318, 319, 326, 330, 331

[56] References Cited

U.S. PATENT DOCUMENTS

| | | | |
|---|---|---|---|
| 4,398,790 | 8/1983 | Righini et al. | 350/96.18 |
| 4,412,720 | 11/1983 | Costa | 350/96.18 |
| 4,475,788 | 10/1984 | Tomassini et al. | 350/96.20 |
| 4,572,668 | 2/1986 | Auth | 356/318 |
| 4,676,586 | 6/1987 | Jones et al. | 350/96.20 |
| 4,681,396 | 7/1987 | Jones | 350/96.18 |
| 4,726,645 | 2/1988 | Yamashita et al. | 350/96.18 |
| 4,732,450 | 3/1988 | Lee | 350/96.18 |
| 4,744,620 | 5/1988 | Ueno et al. | 350/96.18 |
| 4,753,521 | 6/1988 | Deserno | 350/96.18 X |
| 4,807,954 | 2/1989 | Oyamada et al. | 350/96.15 |
| 4,842,360 | 6/1989 | Caro et al. | 350/96.18 |
| 4,844,574 | 7/1989 | Chande | 350/96.18 |
| 4,868,361 | 9/1989 | Chande et al. | 350/96.18 X |
| 4,883,333 | 11/1989 | Yanez | 350/96.10 |
| 4,929,045 | 5/1990 | Fuller | 350/96.18 X |

Primary Examiner—Brian Healy

[57] ABSTRACT

A coupling interface between a two components of a spectrometer system having a monochromator, a spectrometer and a fiber cable therebetween includes a focusing lens and two crossed cylindrical lenses. The focusing lens is used to assure that the convergence angle of light entering the fiber is within the acceptance angle of the fiber. A dual lens system is used to collimate the light from the monochromator, first in one direction of divergence, then in a second direction of divergence. In a second embodiment, the focusing lens is used to collimate the light from the fiber optic cable. The dual lens system is used to converge the collimated light in two directions.

21 Claims, 1 Drawing Sheet

MONOCHROMATOR TO FIBER-CABLE COUPLING SYSTEM

BACKGROUND OF THE INVENTION

1. Field of the Invention

The present invention relates to optical coupling systems and more particularly to optical coupling systems configured to couple the maximum amount of light from a monochromator into an optical fiber cable or from a fiber optic cable to a spectrometer.

2. Related Prior Art

Prior art has many methods for focusing incident light onto a specific location. The simplest form is a single lens which takes divergent light that is incident on one surface of the lens and focuses all these light rays at one point, the focal point of the lens. The following United States patents are example of prior art optical focusing systems which are considered relevant to the present invention.

U.S. Pat. No. 4,412,720, titled "Optical System Coupling a Rectangular Light Source to A Circular Light Receiver", issued to Bruno Costa, relates to an optical coupling system wherein a light source of rectangular outline, such as a semiconductor laser, is optically coupled to a light receiver of circular outline, such as an end of an optical fiber. This coupling is done by an anamorphotic system including a pair of spherical lenses and an afocal pair of cylindrical lenses interposed in a telocentric field between the light source and light receiver. When the system is used for measuring the attenuation of a fiber by the back-scattering technique, a semireflecting prism is inserted between the cylindrical lenses and the fiber-side spherical lens to direct part of the returning beam toward a photodetector The effect of spurious reflections at the fiber end may be minimized by the use of a polarizationsensitive Glan prism and/or by the positioning of a flat transparent plate in front of the fiber end.

U.S. Pat. No. 4,475,788, titled "Coupling Between Laser and Optical Fiber", issued to Maurizio Tomassini et al. relates to an optical system used to focus the beam of a laser onto a receiving end of an optical fiber. The laser output is formed by a plano-convex lens with a semi-transparent flat face confronting the laser cavity and an anti-reflecting curved face turned toward the fiber. Alignment of the laser beam with the fiber axis is accomplished by the adjustment of two oppositely pointing juxtaposed wedges placed between the lens and the laser.

U.S. Pat. No. 4,726,645, titled "Optical Coupler", issued to Junichiro Yamashita et al. relates to an optical coupling unit having an optical coupler adapted to couple a light beam from a light-emitting element to an optical fiber. The aberration of the lens is decreased to improve the efficiency of coupling of the light beam from the light-emitting element to the optical fiber. A silicon crystal having a high refractive index is used as a lens material to realize an optical system of low aberration.

U.S. Pat. No. 4,732,450, titled "Input/Output Coupling Device for Optical Fiber Used in High Power Laser Beam Delivery", issued to Chun-Sheu Lee relates to an input/output fiber coupling device for an optical fiber that includes a chamber wall having an opening at one side and a bore at the opposite side. The chamber wall forms a cavity and has a focusing lens that fits within the opening. The lens has input and output laser beam paths aligned with the fiber longitudinal axis, and focuses a laser beam onto the end face of the fiber which is inserted into the cavity through the bore. An index-matching fluid circulates within the cavity between the lens and the fiber end face.

U.S. Pat. No. 4,744,620, titled "Optical Coupler", issued to Hiroshi Ueno et al. relates to an optical coupler having a lens for coupling a light source and an optical fiber. The lens comprises a transparent column in which a refractive index n(r) at a distance r from an optical axis is expressed by:

$$n^2(r) = n_0^2\{1 - (gr)^2 + h_4(gr)^4 + h_4(gr)^6 + h_8(gr)^8 + ...\}$$

and satisfies the following conditions when Sf equals g divided by point three; $C_1/Sf$ is between zero and point sixty-seven; $C_2$ equals zero; $l_1Sf$ is greater than or equal to zero and less than or equal to one point five; and $h_4$ is greater than or equal to point five and less than or equal to two. $C_1$ and $C_2$ are curvatures of input and output end faces of the lens (the sign is positive when the center of the radius of curvature is positioned at the side of the optical fiber with respect to the end face). $l_1$ is a back focus at the side of the light source, $n_0$ is a refractive index on the optical axis, and g, $h_4$, $h_6$ and $h_8$ are distribution constants.

U.S. Pat. No. 4,753,521, titled "Lens System for Focussing a Divergent Laser Beam", issued to Ulrich Deserno relates to a lens system for focussing a divergent laser beam. This system may be used for converting the three dimensional amplitude and phase distribution of the highly divergent laser beam of a semiconductor laser into the amplitude and phase distribution of the fundamental mode coupleable into a monomode fiber. The lens system comprises a front element in the form of a collecting aplanatic meniscus and one or more following refractive lenses for focussing the laser beam emerging from the front element. The refractive front face of the meniscus facing the object side aberration free point is designed such that it at least approximately has the form of a phase surface of the divergent laser beam emanating from a location close to the object side aberration free point which impinges the meniscus. A tilting of the meniscus relative to the laser radiation causes the part of the divergent laser radiation reflected by the front face to be refocussed next to the source, to provide coupling optics for coupling a semiconductor laser to a fiber.

SUMMARY OF THE INVENTION

The present invention provides an optical device for coupling the maximum amount of light between the end of a fiber optic cable and a monochromator output or a spectrometer input. When coupled between a fiber optic cable and a monochromator, the device consists of a lens system for adapting rectangular light output into a circular focus smaller than the end of the optic fiber. The rectangular light beam is first collimated by passage through successive, ninety degree rotated cylindrical lenses whereupon the collimated beam is then reduced by a plano-convex lens to a focus on the optic fiber tip end. When coupled between a fiber optic cable and a spectrometer, the device consists of a lens system for taking divergent light from the fiber and directing it to the spectrometer. The light beam is collimated by a focusing lens, then converged through two ninety degree rotated cylindrical lenses and directed to the spectrometer.

DESCRIPTION OF THE PREFERRED EMBODIMENT

The problem the present invention solves is to couple the maximum amount of light from the output of a monochromator into a fiber optic cable and from the output of the fiber optic cable to a spectrometer. To do this in coupling a monochromator to a fiber optic cable, two conditions must be satisfied. First, the convergence angle of light entering the fiber must be within the fiber's acceptance angle, so the light remains in the fiber as it propagates by total internal reflection. Second, the diameter of the focused spot of light on the face of the fiber must be smaller than the core diameter of the fiber.

The method of the first embodiment of the present invention which meets these conditions is to first collimate the light from the monochromator, then focus it. This can be done in prior art with one compound lens for light that diverges equally in all directions. However, the output from a monochromator diverges differently in the horizontal than in the vertical direction, and has a rectangular cross-section. To solve these problems, the present invention uses two crossed cylindrical lenses with different focal lengths and F numbers to collimate the light from the monochromator, then uses a plano-convex (PCX) lens to focus the light into the fiber. The PCX lens is chosen to satisfy the two conditions listed above.

In prior art, crossed cylindrical lenses have been used to change an extended source into a rectangular shape to fill the input slit of a monochromator. In a first embodiment of the present invention, the rectangular diverging light from a monochromator is taken, its spatial characteristics are changed, and another lens is used to focus it into a fiber-optic cable. In a second embodiment, light from the fiber optic cable is collimated by a first lens, then changed to match the divergences or accepance angles of the spectrometer through the use of two cylindrical lenses.

Figure 1:
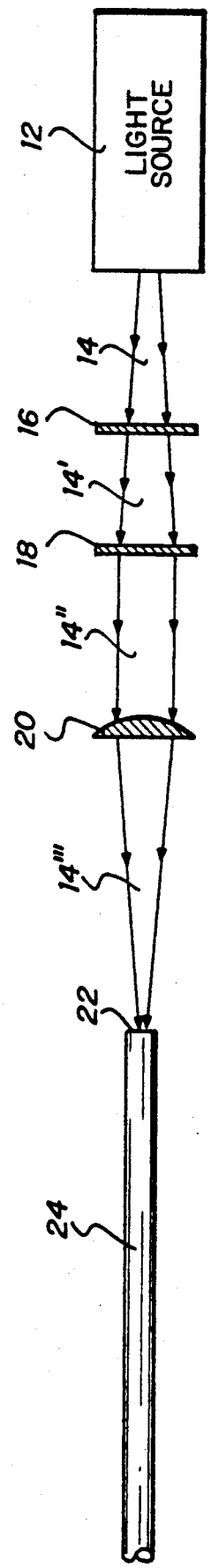
FIG. 1 is a schematic drawing of a monochromator to optical fiber cable coupling system.

Referring now to FIG. 1, the apparatus of the present invention is illustrated as receiving light from a light source within a monochromator. Monochromator 12 produces a light beam 14 that is incident upon a first cylindrical lens 16. Lens 16 passes light beam 14 and collimates it in a first direction. Light beam 14', collimated in a first direction, travels to a second cylindrical lens 18 where it is collimated in a second direction. Although in the present invention the first and second cylindrical lenses are configured such that they collimate light that is divergent in two perpendicular directions, the method and apparatus of the present invention may be used on systems where divergence is in two directions that are at an angle other than ninety degrees.

Light beam 14', after being collimated in a second direction by cylindrical lens 18, is focused by a plano convex lens 20. Focused and collimated light beam 14''' is then incident on face 22 of fiber optic cable 24, where it is transmitted to another location.

To collimate light, a lens must have an F number equal to the F number of the incident diverging light, and be placed one focal length from the source.

F number is inversely proportional to the angle of converging or diverging cone of light leaving a lens or a source. F number is defined as:

$$F\,Number = \frac{1}{2\,N.A.} = \frac{FL}{D} = \frac{1}{2\left(\sin\frac{\alpha}{2}\right)}$$

where
N.A. = numerical aperture
FL = focal length of lens
D = diameter of illuminated spot on lens
$\alpha$ = angle of divergence or convergence The F numbers of the components of the apparatus of the present invention were measured from a Photon Technology International, Inc. (PTI) Monochromator. The F numbers are 4.2 horizontal and 6.7 vertical. To collimate this rectangular diverging light 14, two cylindrical lenses 16 and 18 of matching F numbers with 100 and 200 mm focal lengths can be used. Other focal lengths can be used as well. In the preferred embodiment lenses 16 and 18 are from Melles Griot, Inc. The size of lenses 16 and 18 are specified to be large enough to collect all the light from monochromator 12. Cylindrical lenses 16 and 18 will produce a rectangular collimated beam of light 14,, with about a 25 mm×25 mm cross-section.

Plano convex lens 20 (Part No. 01LQP019 from Melles Griot, Inc.) focuses collimated light 14'' onto the input face 22 of optical fiber 24. Lens 20 must converge light beam 14''' within the acceptance angle of the fiber, which means from the foregoing equation that the F number of the lens has to be greater than the F number of the fiber. In the preferred embodiment, optical fiber 24 is from Guided Wave, Inc. and has an F number of 2.27, and the F number of lens 20 is 4.94. In addition, lens 20 must be large enough to collect all the incident light, which is about 25 mm×25 mm. Lens 20 will do this because it has a diameter of 50 mm.

Next the spot size must be checked. To do this, the diffraction limited spot size is added to the spherical aberration.

The diffraction limited spot size is given by:

$$SS_{DIFF} = 2\frac{FL \times \lambda}{\pi \times R}$$

where:
FL = focal length of lens
$\lambda$ = wavelength of incident light
R = radius of illuminating beam The spherical aberration is given by:

$$SA = \frac{0.067 \times FL}{(F\,Number)^3}$$

The equation for $SS_{DIFF}$ gives 2.0 microns, and the equation for SA gives 97.1 microns for a total spot size of about 99 microns, which is smaller than the 320 micron fiber core of optical fiber cable 24.

Finally, different fiber cables can be used for maximizing light throughput for different wavelength ranges: ultraviolet, visible, and near infrared. Also, all the lenses can be made of synthetic fused silica, so the index changes very little over those regions. Achromatic lenses can be used to avoid refraction effects. The invention works for both single-strand and bundle-type fiber cables.

Figure 2:
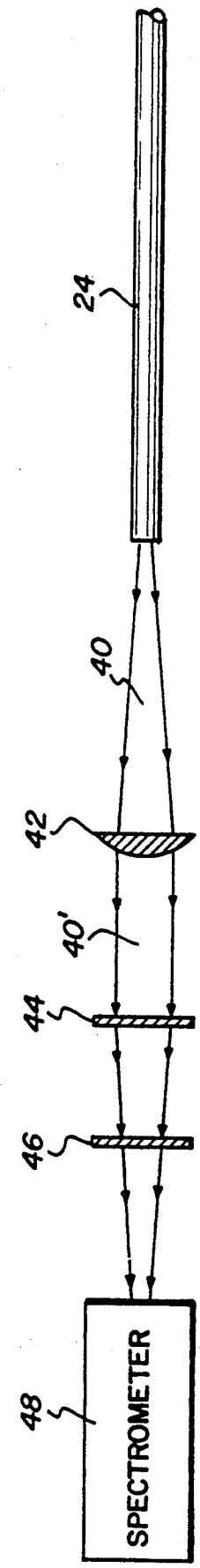
FIG. 2 is a schematic drawing of an optical fiber cable to spectrometer coupling system.

Referring now to FIG. 2, the apparatus of the present invention is illustrated as receiving light from fiber optic cable 24. A light beam 40 from optic cable 24 is incident upon a convex lens 42. Lens 42 passes light beam 40 and collimates it. Light beam 40, after being collimated, travels to a first cylindrical lens 44 where it is converged in a first direction. Light beam 40', converged in a first direction, travels to a second cylindrical lens 46 where it is converged in a second direction. Although in the present invention the first and second cylindrical lenses are configured such that they converge light that is divergent in two perpendicular directions, the method and apparatus of the present invention may be used on systems where divergence is in two directions that are at an angle other than ninety degrees.

Light beam 40', after being converged in a second direction by cylindrical lens 46, is then incident on spectrometer 48.

The plano convex lens previously described cannot be used in this application, because the lens has to be placed one focal length (175 mm) away from the end of the fiber to collimate the light. Since light leaving the fiber diverges at an angle (25.4° for this fiber) greater than the angle of converging light coupled in, the light leaving the fiber will overfill the original plano convex lens at this distance Consequently, some light is lost.

If the original lens was specially designed with an F number equal to the F number of the fiber, then it could be used for both coupling in and out of the fiber. Another lens from Melles Griot (part number 01LQP001, 50 mm focal length, 25 mm diameter) can be used for the second application, because at its focal length the light leaving the fiber will underfill the lens and therefore, all the light is captured and collimated. If this lens is used, then the two cylindrical lenses previously described can be used to converge the light in two different ninety degree rotated directions to match the F numbers of the spectrometer. The spectrometer used is the same monochromator previously described but the lamp source is replaced with a photomultiplier tube to detect the incoming light. Again the two cylindrical lenses are placed at their respective focal lengths away from the input slit on the spectrometer.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

We claim:

1. In a spectrometer system, an apparatus for coupling light from an excitation monochromator into a fiber optic cable comprising:
    a first cylindrical lens having a preselected F number for receiving light from the monochromator to collimate said light in a first direction;
    a second cylindrical lens having said preselected F number for receiving light passing through said first cylindrical lens to collimate said light in a second direction; and
    a plano convex lens arranged to receive light that has been collimated in two directions passing through said second cylindrical lens to focus said corrected light on the fiber optic cable.

2. The apparatus according to claim 1 wherein said first cylindrical lens has a focal length of 100 mm and said second cylindrical lens has a focal length of 200 mm.

3. The apparatus according to claim 2 wherein said second cylindrical lens is configured to collimate light such that said second direction is rotated ninety degrees from said first direction.

4. The apparatus according to claim 2 wherein said plano convex lens has an F number greater than the F number of the fiber optic cable.

5. The apparatus according to claim 4 wherein said plano convex lens passes light having a convergence angle within the acceptance angle of the fiber optic cable.

6. The apparatus according to claim 4 wherein said plano convex lens passes light having a focused spot with a diameter smaller than the diameter of the fiber optic cable.

7. In combination:
    a spectrometer system, having an excitation monochromator, a fiber optic cable and an apparatus for coupling light from said excitation monochromator into said fiber optic cable including a first cylindrical lens having a preselected F number and a focal length of 100 mm for receiving light from the monochromator to collimate said light in a first direction, a second cylindrical lens having said preselected F number and a focal length of 200 mm for receiving light from said first cylindrical lens to collimate said light in a second direction and a plano convex lens having an F number greater than the F number of the fiber optic cable arranged to receive light that has been collimated in two directions passing through said second cylindrical lens to focus said corrected light on the fiber optic cable said plano convex lens passing light having a convergence angle within the acceptance angle of the fiber optic cable and passing light having a focused spot with a diameter smaller than the diameter of the fiber optic cable.

8. A method for providing focused light on the end surface of a fiber optic cable in a spectrometer system having an excitation monochromator and a fiber optic cable comprising:
    passing light from the monochromator through a first cylindrical lens having a preselected F number for collimating said light in a first direction;
    passing light from said first cylindrical lens through a second cylindrical lens having said preselected F number for collimating said light in a second direction; and
    focusing said light that has been collimated in two directions passing through said second cylindrical lens on the fiber optic cable by passing it through a plano convex lens.

9. The method according to claim 8 wherein said passing light through a first cylindrical lens includes providing a first cylindrical lens having a focal length of 100 mm and said passing light from said first cylindrical lens includes providing a second cylindrical lens having a focal length of 200 mm.

10. The method according to claim 8 wherein said focusing step includes the step of:
    passing said light that has been collimated in two directions through a plano convex lens having an F number greater than the F number of the fiber optic cable.

11. The method according to claim 8 wherein said focusing step includes the step of:
   passing said light that has been collimated in two directions through a plano convex lens that passes light having a convergence angle within the acceptance angle of the fiber optic cable.

12. The method according to claim 8 wherein said focusing step includes the step of:
   passing said light that has been collimated in two directions through a plano convex lens that passes light having a focused spot with a diameter smaller than the diameter of the fiber optic cable.

13. The method according to claim 8 also including the step of:
   rotating the collimating axis of said second cylindrical lens ninety degrees with respect to the collimating axis of said first cylindrical lens.

14. In a spectrometer system, an apparatus for coupling light from a fiber optic cable into a spectrometer comprising:
   a plano convex lens arranged to receive light from said fiber optic cable to collimate said light;
   a first cylindrical lens having a preselected F number for receiving light from said plano convex lens to converge said light in a first direction; and
   a second cylindrical lens having said preselected F number for receiving light passing through said first cylindrical lens to converge said light in a second direction.

15. The apparatus according to claim 14 wherein said first cylindrical lens has a focal length of 200 mm and said second cylindrical lens has a focal length of 100 mm.

16. The apparatus according to claim 15 wherein said second cylindrical lens is configured to converge light such that said second direction is rotated ninety degrees from said first direction.

17. The apparatus according to claim 15 wherein said plano convex lens has an F number equal to the F number of the fiber optic cable.

18. A method for providing focused light to a spectrometer from a fiber optic cable in a spectrometer system having an spectrometer and a fiber optic cable comprising:
   collimating said light from the fiber optic cable by passing it through a plano convex lens;
   passing light from said plano convex lens through a first cylindrical lens having a preselected F number for converging said light in a first direction;
   passing light from said first cylindrical lens through a second cylindrical lens having said preselected F number for converging said light in a second direction.

19. The method according to claim 18 wherein said passing light through a first cylindrical lens includes providing a first cylindrical lens having a focal length of 200 mm and said passing light from said first cylindrical lens includes providing a second cylindrical lens having a focal length of 100 mm.

20. The method according to claim 18 wherein said collimating step includes the step of:
   passing said light through a plano convex lens having an F number equal to the F number of the fiber optic cable.

21. The method according to claim 18 also including the step of:
   rotating the convergence axis of said second cylindrical lens ninety degrees with respect to the convergence axis of said first cylindrical lens.

* * * * *